Oct. 25, 1949.  B. A. KELJIK  2,485,890
BARBECUE APPARATUS
Filed Jan. 11, 1946  2 Sheets-Sheet 1
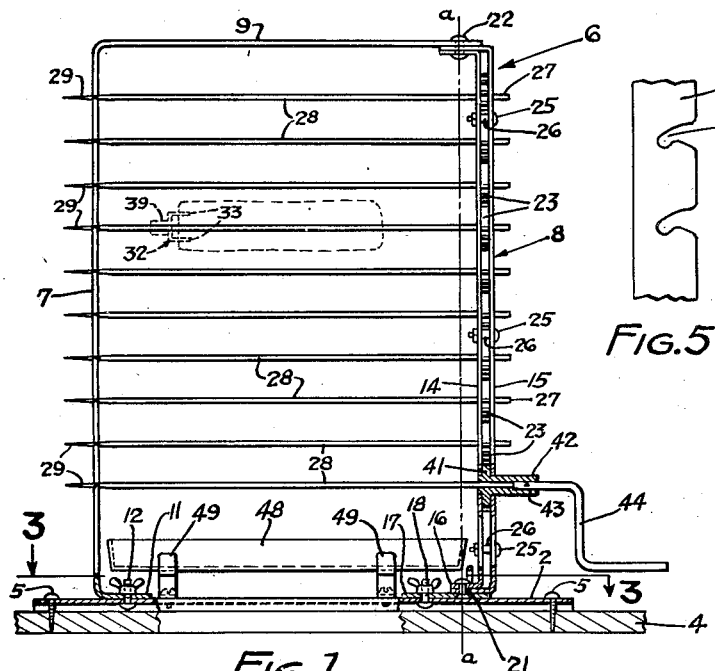
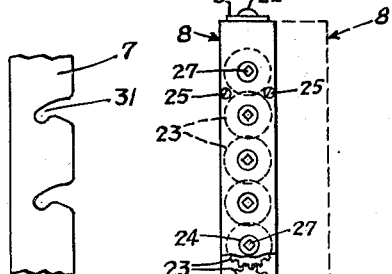
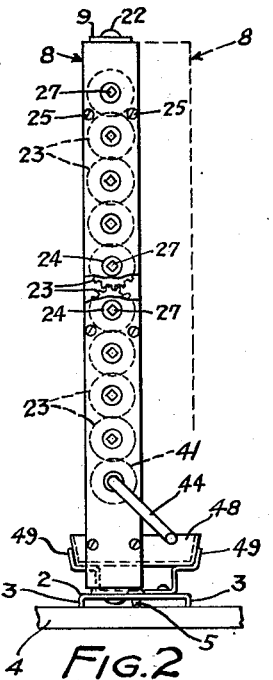
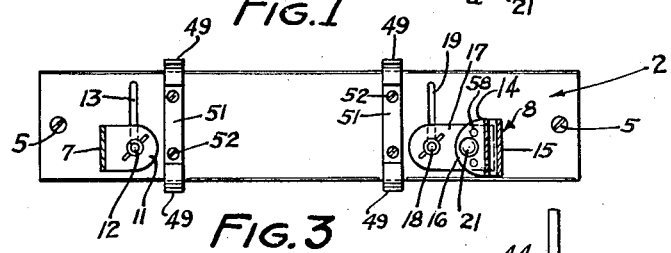
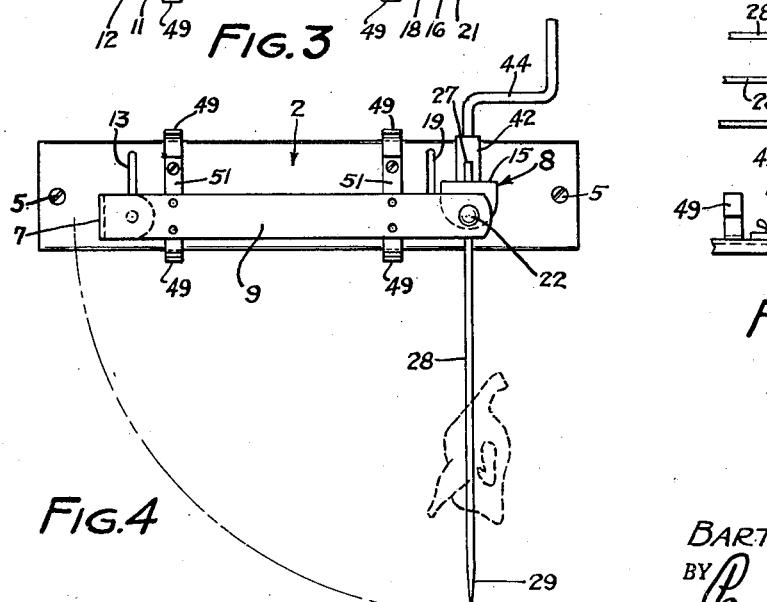
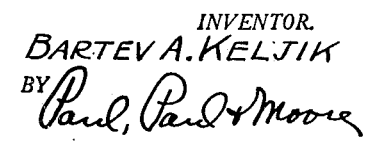
INVENTOR.
BARTEV A. KELJIK
BY Paul, Paul & Moore
ATTORNEYS Oct. 25, 1949.    B. A. KELJIK    2,485,890
BARBECUE APPARATUS
Filed Jan. 11, 1946    2 Sheets-Sheet 2

INVENTOR.
BARTEV A. KELJIK
BY
Paul, Paul & Moore
ATTORNEYS

Patented Oct. 25, 1949

2,485,890

UNITED STATES PATENT OFFICE 2,485,890

BARBECUE APPARATUS

Bartev A. Keljik, Minneapolis, Minn.

Application January 11, 1946, Serial No. 640,449

5 Claims. (Cl. 99—421)

This invention relates to new and useful improvements in an apparatus for barbecuing meats and other food articles which may be so treated.

Numerous attempts have heretofore been made to develop an apparatus of this general character which would meet the requirements of such an apparatus, but most of these have been more or less complicated and expensive to manufacture, and as a result they have not been generally accepted by the public. An object of the present invention therefore is to provide an apparatus of this general type which is extremely simple and inexpensive in construction, is simple to manipulate, and which is so constructed that food articles to be barbecued may readily and quickly be mounted upon the meat-supporting pins or spits thereof, and which may be used in either a vertical or a horizontal position, as may be desired.

A further object is to provide an apparatus for barbecuing food articles comprising a simple and inexpensive base which may be conveniently secured to a suitable table top or other support, when the apparatus is to be used in an upright position, as when utilized in restaurants, and such places, whereby the apparatus requires a minimum of space and also whereby all of the spits are readily accessible for mounting the meat thereon or removing therefrom.

A further object is to provide such an apparatus comprising a rectangular frame comprising two upright side frame members and a top member, and one of the side frame members having mounted therein a plurality of intermeshing gears, each provided with a socket adapted to non-rotatably, but removably receive a spit in such a manner that the spit may readily be removed from the apparatus to facilitate inserting it through an article to be barbecued, and the other of said side frame members having bearing portions therein for receiving the opposite ends of the spits, whereby the spits are supported at each end so that the weight of the article to be barbecued is uniformly distributed upon the two side frame members, and the side frame member embodying the intermeshing gears being mounted for relative rotary movement about a vertical axis, whereby the meat supporting pins or spits may be swung outwardly away from the source of heat to permit convenient removal of the food articles therefrom, and also whereby the operation of mounting the food articles on the pins is greatly facilitated.

A further object of the invention resides in the provision of such an apparatus whereby the frame which supports the spits may be relatively adjusted upon its supporting base towards or away from the source of heat, whereby the broiling action upon the meat may be accurately controlled.

A further object is to provide such an apparatus which may be used in either an upright or a horizontal position, whereby it may be utilized in conjunction with any suitable vertically disposed source of heat such as an electric heating element, or, if desired, it may be placed in a horizontal position over a bed of hot coals such as a bed of charcoal.

A further object is to provide such an apparatus which in itself is extremely light in weight, whereby when detached from its supporting means or table, it may readily be moved about from place to place, as, for example, when it is desired to use it at picnics and other outdoor places, as it may readily be used in conjunction with any source of heat available at such places.

Other objects of the invention reside in the provision of such an apparatus in which the main supporting structure may be manufactured from flat stock, whereby the parts thereof may be quickly and inexpensively formed in conventional stamping and forming equipment, to thereby reduce the manufacturing cost to a minimum; in the provision of such an apparatus which readily lends itself for manual or power operation, regardless of whether mounted in an upright or horizontal position; in the provision of such an apparatus which comprises few parts, all of which are so constructed and related to one another that the apparatus may be quickly assembled; and in the provision of such an apparatus having means whereby when used in connection with a relatively fixed source of heat, the spits or meat-supporting pins may be adjusted relatively to the source of heat to obtain the desired broiling action of the source of heat upon the meat or other food articles to be barbecued.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevational view showing the apparatus in an upright position and parts thereof being broken away to more clearly show the mounting of the upright frame upon its supporting base;

Figure 2 is an end view of Figure 1;

Figure 3 is a sectional plan view on the line 3—3 of Figure 1, showing the means provided for laterally adjusting the position of the frame upon its supporting base;

Figure 4 is a top view of Figure 1 showing the spits swung outwardly to render them more accessible;

Figure 5 is a fragmentary view showing the means provided at the tip ends of the spits to support them when in barbecuing position;

Figure 10:

Figure 10 is an enlarged perspective view showing a skewer slidably mounted upon a spit, whereby it may be inserted into the meat to assure that the meat will rotate with the pin during the barbecuing operation; and Figure 11 is a fragmentary view of the drive end of the apparatus showing a small motor having a driving connection with the lower drive gear, as when the apparatus is to be power driven.

The novel apparatus herein disclosed is shown comprising a suitable elongated base, generally designated by the numeral 2, which may be formed from sheet metal, as here shown, or, if desired, it may be made of any other suitable fire-proof material applicable for the purpose. The base is preferably formed with longitudinally extending marginal flanges 3, the lower edges of which are adapted to rest upon a suitable support or table, indicated at 4 in Figures 1 and 2, and to which it may be secured by suitable means such as screws 5, when the apparatus is to be fixed thereto.

An upright frame, generally designated by the numeral 6, is mounted upon the base 2 and comprises spaced side members 7 and 8 having their upper ends tied together by a top member 9. To simplify manufacture, the top member 9 is here shown integrally formed with the side member 7. The lower end of the side member 7 is inwardly bent to provide a foot 11 which is seated upon the base 2 and is secured thereto by a suitable clamping screw 12, received in a slot 13 provided in the base, and whereby the frame 6 may be laterally adjusted upon the base for reasons subsequently to be described.

The other side frame member 8 is shown comprising spaced bars 14 and 15, and each has its opposite ends bent inwardly, as best shown in Figure 1. The inwardly bent lower ends of the bars 14 and 15 cooperate to form a foot 16 which is pivotally mounted upon a suitable plate 17. The plate 17 is adjustably secured to the base 2 by a clamping screw 18 movable in a slot 19 similar to the slot 13 provided adjacent the opposite end of the base. A suitable rivet or stud 21 pivotally mounts the foot 16 upon the plate 17.

The inwardly bent upper ends of the bars 14 and 15 of the frame member 8 are pivotally connected to the top member 9 by a suitable pivot pin 22. By thus pivotally securing the foot 16 of the side frame member 8 to the plate 17, and by pivotally connecting the upper end thereof to the top member 9, the side frame member 8 may be rotated about a vertical axis $a$—$a$, shown in Figure 1, thereby to permit swinging the spits or meat-supporting pins outwardly from the position shown in Figure 1 to that shown in Figure 4.

Between the bars 14 and 15 of the side frame member 8 there is mounted a plurality of intermeshing gears 23, each provided with opposed hubs 24 rotatably received in suitable bearings provided in the bars. The bars are retained in fixed spaced relation by suitable studs or bolts 25 and spacers 26, whereby the gears or pinions 23 may freely rotate therebetween.

Figure 8:
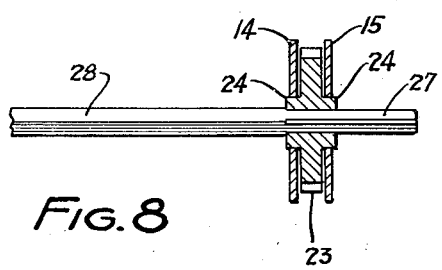
Figure 8 is an enlarged detail sectional view on the line 8—8 of Figure 6.

Each gear is provided with an axial aperture or socket which preferably is square cross-sectionally, adapted to receive the shank 27 of a suitable spit or meat-supporting pin 28, shown in Figures 8 and 10. The opposite or pointed ends 29 of the spits 28 are supported in suitable open slots or bearing portions 31 provided in the side frame member 7, as best illustrated in Figure 5.

The meat-supporting pins or spits 28 are preferably square in cross section, as shown in Figure 10, thereby to prevent the meat from relatively rotating thereon when the pins are rotated during the barbecuing operation. However, to assure that the meat will not relatively rotate upon the spits, a suitable skewer, generally designated by the numeral 32, may be used, which is shown comprising one or two prongs 33 fixed to a suitable slide 39 adapted for sliding movement upon the spit, as will be understood by reference to Figure 10.

The means provided for rotating the spits is best shown in Figures 1 and 2, wherein the device is shown adapted for manual operation. To simplify the driving means, the lower gear or pinion 41 is shown provided with an extended hub 42 which, as shown in Figure 1, is provided with a bore 43 adapted to receive one end of a suitable crank 44, whereby all of the gears and spits may be conveniently simultaneously rotated by manipulation of the crank 44.

In Figure 11, a small bracket 45 is shown secured to the lower portion of the side frame member 8 adapted to support a suitable motor 46 having a driving connection with the extended hub 42 of the gear 41. The driving connection between the motor 46 and the gear 41 is indicated at 47, and preferably is of a suitable speed reducer type, thereby to impart the proper speed to the spits, when the motor is operated. If desired, a variable speed motor may be utilized so that the rotary movement of the spits may be controlled, as may be required to obtain the desired broiling action from the source of heat. Such broiling action, however, may also be controlled by utilizing a source of heat which is variable, or it may also be controlled by relatively varying the spacing between the spits and the source of heat by relatively adjusting the position of the frame 6 upon the base by means of the clamping screws 12 and 18 and the slots 13 and 19, respectively.

A suitable drip pan 48 is shown removably supported upon the base 2 by suitable brackets 49 which may be formed of strap material to simplify manufacture. The brackets 49 at each end of the drip pan 48 may be integrally formed, as will be understood by reference to Figures 2 and 3, and their horizontal portions 51 are provided with suitable apertures adapted to receive screws 52 which may be received in threaded sockets provided in the base 2, or, if desired, suitable bolts may be used having nuts received in threaded engagement with the terminals thereof on the bottom side of the base.

Figure 6:
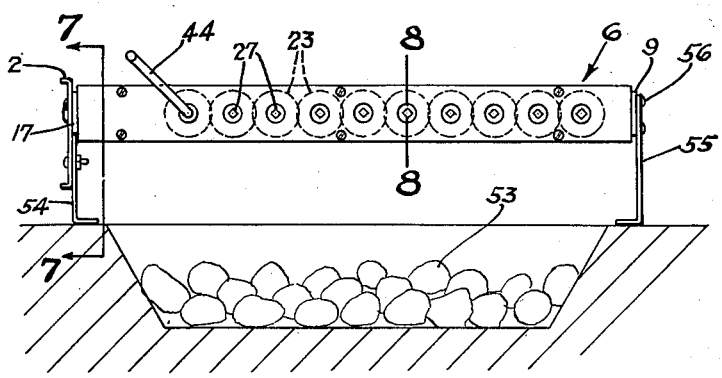
Figure 6 is a view showing the apparatus arranged for horizontal mounting.
Figure 7:
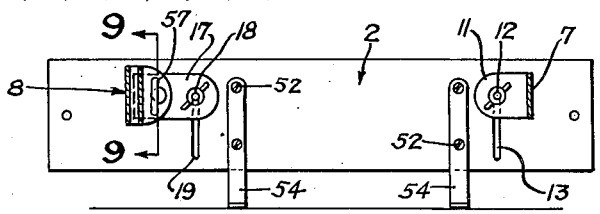
Figure 7 is a detail sectional view on the line 7—7 of Figure 6, showing the means provided for supporting the base of the apparatus in spaced relation to the ground or floor level.

Means is provided whereby the apparatus may also be utilized in a horizontal position, as when used at picnics or outdoors, where the source of heat would be more likely to be in the form of a bed of hot coals, as shown at 53 in Figure 6. To thus support the apparatus in a horizontal position, the drip pan supporting brackets 49 are removed from the base, and in lieu thereof suitable supporting legs 54 are substituted therefor. These legs 54 may be secured to the base by the same screws that secure the brackets 49 thereto. Similar legs 55 are secured to the top frame member 9 by bolts or screws 56, as will be understood by reference to Figure 6.

When thus supported, the spits 28 may be rotated by manipulation of the crank 44 in identically the same manner as when the frame 6 is in an upright position. The spits may also be swung outwardly away from the source of heat, as shown in Figure 4, by relatively swinging the side frame member 8 about the axis a—a, thereby to facilitate mounting the articles to be barbecued upon the pins or removing them therefrom.

It will thus be noted that the novel apparatus herein disclosed readily lends itself for use at picnics or outdoor places where an ordinary bed of hot coals may be utilized as the source of heat. The entire apparatus is very light in weight and requires little storage space, whereby it may be conveniently transported about from place to place when so desired.

Figure 9:
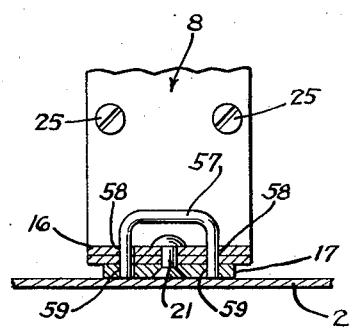
Figure 9 is an enlarged detail sectional view on the line 9—9 of Figure 7, showing the means for locking the swingable frame member against rotary movement.

To prevent the frame side member 8 from relatively rotating about the axis a—a when operating the crank 44, means is preferably provided for locking the foot 16 of the frame side member 8 against relative rotation upon the plate 17. A simple form of locking means is shown in Figure 9, wherein a U-shaped member 57 is shown received in aligned apertures 58 and 59 provided in the foot 16 of the frame member 6 and the plate 17. When the locking member 57 is in the position shown in Figure 9, the frame side member 8 is locked against relative rotation upon the plate 17, and when removed from the apertures or sockets 58 and 59, the frame member 6 may be freely rotated, as hereinbefore described.

The novel barbecuing apparatus herein disclosed presents the utmost in simplicity, both as to construction and operation, whereby it provides a very practical and efficient apparatus which readily lends itself for barbecuing meats and various other food articles in restaurants and other places where barbecued foods are served, as well as for home use and outdoor functions such as picnics, where it may be desired to serve barbecued food articles.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

What I claim is:

1. In an apparatus of the class described, an elongated base, an upright frame comprising spaced parallel side members and a horizontal top member, means mounting said frame for lateral adjustment on the base, a plurality of intermeshing gear elements mounted in one of the frame side members each having a socket therein, spits removably received in said sockets, means for rotating said elements to cause food articles supported on said spits to be rotated with respect to a source of heat, the frame member supporting said gear elements and spits having inwardly turned ears at its upper and lower ends, and means pivotally connecting said ears respectively to the top frame member and said base, whereby the spits may be swung outwardly to a non-barbecuing position to facilitate mounting food articles on the spits or removing them therefrom.

2. In an apparatus of the class described, a base, an upright frame mounted on said base, said upright frame comprising spaced side members and a transverse top member, one of said side members having means for fixedly securing it to the base, and the other of said side frame members having pivotal connections with the top frame member and the base, respectively, whereby said pivoted side frame member is adapted for rotary movement about a vertical axis, a plurality of interconnected rotatable elements on said pivotally mounted side frame member and each having a socket therein, spits removably received in said sockets, means for rotating said elements to rotate food articles supported on said spits, the pivotally mounted side frame member permitting the spits to be swung outwardly to a position to facilitate mounting food articles thereon or removing them therefrom.

3. In an apparatus of the class described, an elongated base, an upright frame mounted for lateral adjustment on said base, said upright frame comprising spaced side members, one of said side members having means for fixedly securing it to the base member, and the other of said side members being mounted for pivotal movement about a vertical axis, a plurality of interconnected rotatable elements in said pivotally mounted side frame member, and each having a socket therein, spits removably received in said sockets, means for rotating said elements whereby food articles supported on the spits may be rotated with respect to a source of heat, said rotatably mounted side frame member permitting the spits to be swung outwardly to facilitate mounting food articles on said spits or removing them therefrom, and means on the fixed side frame member for supporting the free ends of said spits when in barbecuing position in the frame.

4. In an apparatus of the class described, an elongated base, an upright frame mounted for lateral adjustment on said base, said upright frame comprising spaced parallel side members and a horizontal top member, one of said side members having means for fixedly securing it to the base and the other of said side members having pivotal connections with the horizontal top member and the base, whereby it is adapted for rotary movement about a vertical axis, a plurality of intermeshing gear elements mounted in the pivotally supported side frame member and each having a socket therein, spits removably received in said sockets, means for rotating said elements to cause food articles supported on the spits to be rotated with respect to a source of heat, the pivotally mounted side frame member permitting the spits to be swung outwardly to a position to facilitate mounting food articles on the spits or removing them therefrom, spaced brackets on the base, and a drip pan removably supported on said brackets for catching drippings from food articles supported on the spits.

5. In an apparatus of the class described, a base, an upright frame mounted on said base, an upright frame mounted for lateral adjustment on said base, said upright frame comprising spaced side members and a horizontal top member, one of said side members having means for fixedly securing it to the base member and the other of said side members having pivotal connections, respectively, with the upper frame member and the base, whereby it is adapted for rotary movement about a vertical axis, a plurality of intermeshing gears mounted in said rotatable side frame member, and each having an axially disposed socket therein, a plurality of spits removably received in said sockets, means for simultaneously rotating said gears for rotating the spits supported therein, and bearing portions in the fixed side frame member for supporting the adjacent ends of said spits when in barbecuing position.

BARTEV A. KELJIK.

REFERENCES CITED

The following references are of record in the file of this patent:

UNITED STATES PATENTS

| Number | Name | Date |
|---|---|---|
| 640,305 | Lynch | Jan. 2, 1900 |
| 902,724 | Giovanna | Nov. 3, 1908 |
| 1,912,353 | Howe | May 30, 1933 |
| 2,122,780 | Peyton | July 5, 1938 |
| 2,225,861 | Dufour | Dec. 24, 1940 |
| 2,379,239 | Krebs | June 26, 1945 |

FOREIGN PATENTS

| Number | Country | Date |
|---|---|---|
| 87,703 | Germany | July 24, 1896 |